United States Patent [19]

Brown et al.

[11] 3,730,132
[45] May 1, 1973

[54] CONTROL AND INDICATOR MECHANISM

[75] Inventors: Carlton E. Brown, Tucson, Ariz.; Raymond I. Armstrong, Birmingham, Mich.

[73] Assignee: Lear Seigler, Inc., Krueger Division, Tucson, Ariz.

[22] Filed: Mar. 18, 1971

[21] Appl. No.: 125,606

[52] U.S. Cl. ................116/133, 74/553, 116/129 C, 236/94
[51] Int. Cl. .............................................G09f 9/00
[58] Field of Search ....................116/129 C, 129 G, 116/129, 129 A, 129 B, 124, 133, 124.1; 236/94; 73/194; 74/504, 553

[56] References Cited

UNITED STATES PATENTS

| | | | |
|---|---|---|---|
| 1,387,551 | 8/1921 | Meitner | 116/129 C |
| 1,450,919 | 4/1923 | Harris | 116/129 C |
| 1,975,675 | 10/1934 | Antelme | 116/129 C |
| 2,712,584 | 7/1955 | Pantages | 116/129 C |

*Primary Examiner*—Louis J. Capozi
*Attorney*—William C. Cahill, Samuel J. Sutton and Edwin M. Thomas

[57] ABSTRACT

A manually rotatable knob is mounted adjacent a stationary surface for rotation with a shaft passing through a stationary panel; the knob includes a rear surface having a spiral groove therein. An indicator is pivotally secured to the panel and is positioned between the panel and the knob and includes a follower engaging the spiral grooves of the knob. The indicator also includes an arcuate opening through which the rotatable shaft passes, together with a depending pointer extending radially from the pivot point of the indicator; rotary motion of the knob results in pivotal motion of the pointer by means of the follower traveling in the grooves of the knob.

3 Claims, 5 Drawing Figures

Patented May 1, 1973

INVENTOR.
CARLTON E. BROWN
RAYMOND I. ARMSTRONG

BY

*Cahill Sutton & Thomas*
ATTORNEYS

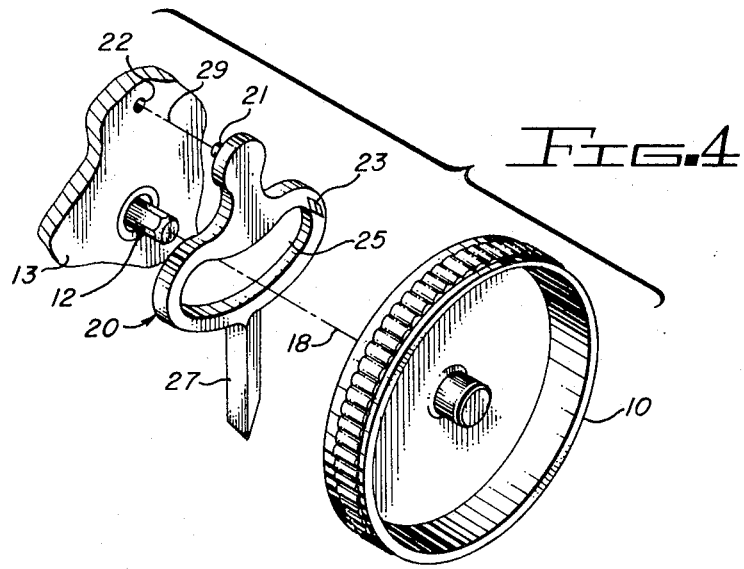
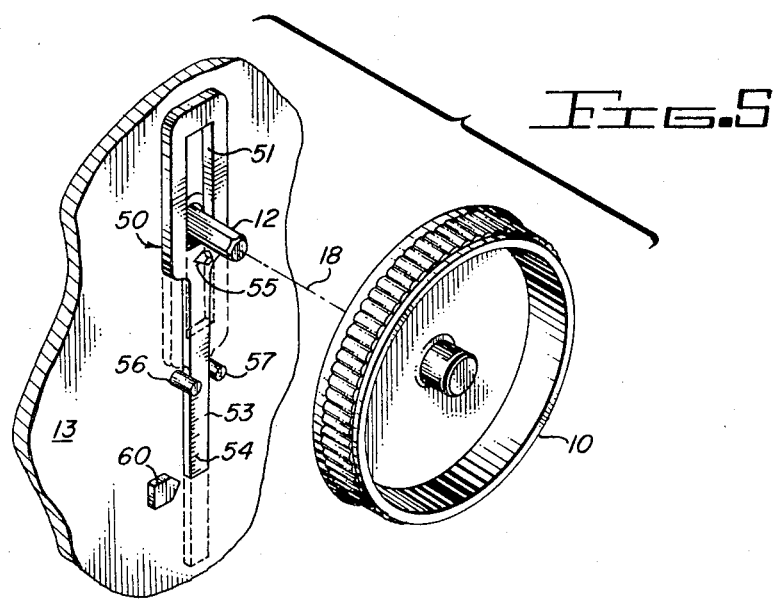

CONTROL AND INDICATOR MECHANISM

The present invention pertains to control mechanisms, and more particularly, to manual control mechanisms incorporating an indicator therein.

In many applications, it is desirable to utilize a manual control lever or knob that may readily be manipulated to effect a small change in the controlled mechanism for a relatively large motion imparted to the controlling mechanism. Further, in instances where control knob or lever forces are relatively high, it is desirable to effect a reduction in the manual forces necessary through a force reduction arrangement. Such mechanisms provide both force reduction and usually permit fine adjustment through the use of the control.

It is therefore an object of the present invention to provide a control and indicator mechanism that permits fine adjustment of the controlled mechanism.

It is another object of the present invention to provide a control and indicator mechanism that permits relatively large forces to be transmitted to the controlled mechanism without requiring correspondingly high forces for the manual manipulation of the control mechanism.

It is still another object of the present invention to provide a manually operable control and indicator mechanism that is simple, rugged, and inexpensive.

These and other objects of the present invention will become apparent to those skilled in the art as the description proceeds.

The present invention may be described by reference to the accompanying drawings, in which:

FIG. 4 is an exploded view, in perspective, of a portion of the apparatus of FIG. 1.

FIG. 5 is an exploded perspective view of another embodiment of the manually operable control and indicator mechanism of the present invention.

Figure 1:
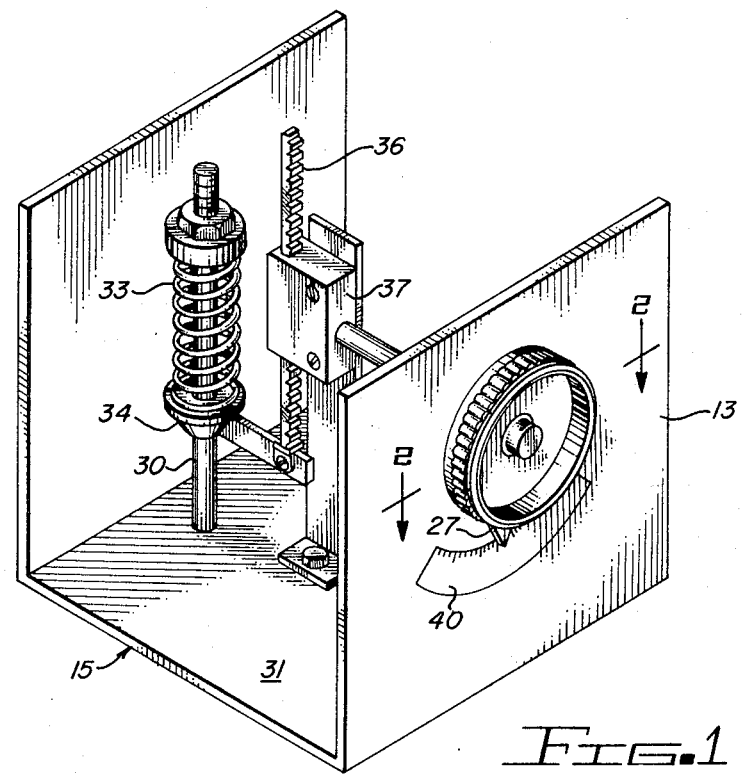
FIG. 1 is a perspective view of a manually operable control and indicator mechanism incorporating the teachings of the present invention and shown in combination with a typical application.
Figure 2:
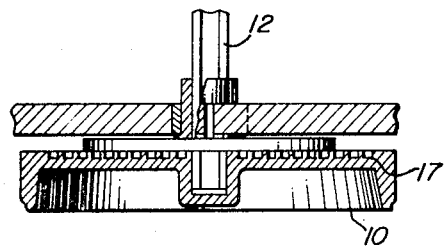
FIG. 2 is a cross-sectional view of a portion of FIG. 1, taken along line 2—2.
Figure 3:
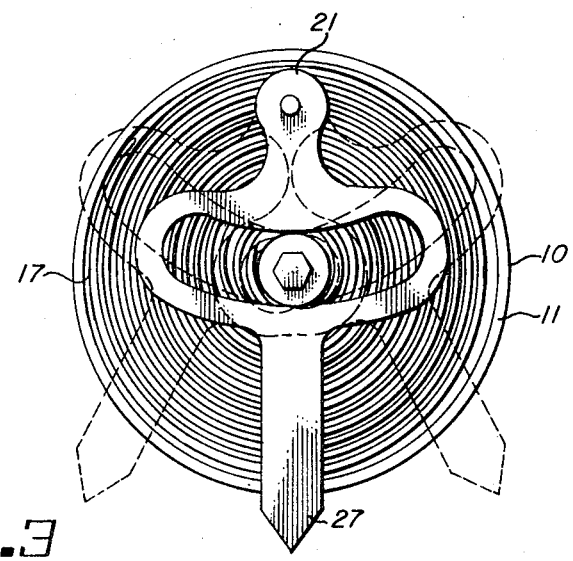
FIG. 3 is a front elevational view, with the knob removed, of a manually operable control and indicator mechanism constructed in accordance with the teachings of the present invention.

Referring now to FIGS. 1–4, a manually rotatable knob 10 is shown mounted on a rotatable shaft 12, the latter extending through an adjacent stationary surface 13. The surface 13 may form a part of the controlled apparatus indicated generally at 15 and chosen as an illustrative application of the apparatus of the present invention. The knob 10 includes a planar surface 11 opposing the surface 13; the planar surface 11 includes a groove 17 formed into a spiral about the rotational axis 18 of the knob 10 and shaft 12. An indicator 20 is pivotally secured to the surface 13 through the expediency of a pivot pin 21 insertably positioned in a hole 22 provided in the surface 13.

The indicator 20 includes a follower 23 that engages the groove 17 of the knob 10. The indicator 20 also includes an arcuate slot 25 that surrounds the shaft 12 and permits the indicator to pivot about the pin 21 while nevertheless providing an automatic stop to the indicator and knob when the indicator has reached the limits of a predetermined maximum arcuate travel. A pointer 27 extends radially from the pivotal axis 29; the indicator 20 is positioned between the surface 13 and the surface 11 while the pointer 27 extends outwardly from between the surfaces to provide a visual indication of the indicator's position.

A typical application of the present invention, as shown in FIG. 1, is a volume rate of flow mechanism found in air conditioning systems. A shaft 30 extends through a bottom plate 31 and is connected to suitable valving mechanism (not shown) for maintaining a predetermined rate of flow. A spring 33 preloads the mechanism and is compressed to provide a predetermined preload condition through the expediency of a spring seat 34 slidingly positioned on the shaft 30. The spring seat 34 may be moved against the force of the spring through a conventional rack 36 driven by a gear mechanism 37. It may be seen that in such an application, and depending on the stiffness of the spring 33, the force required to compress the spring may be quite high; to reduce the force required, the rack and gearing arrangement 36 and 37 may be introduced. However, the introduction of the force reduction mechanism in the forces train thereby dictates considerable motion imparted to the control knob 10. Since several turns of the control knob 10 would therefore be required, it becomes necessary to maintain an indication of the position of the spring seat 34 by means other than a simple pointer mounted on the knob 10.

The apparatus of the present invention permits the multiple turn motion required of the knob 10 while nevertheless accurately and inexpensively maintaining a direct indication of the position of the controlled mechanism, namely, the position of the spring seat 34. This indication is achieved through the pivotal action of the indicator 20 about the pivotal axis 29 induced by the travel of the follower 23 in the spiral groove 17 of the knob 10. In a typical application, the manually operable control and indicator mechanism of the present invention may be formed with a knob approximately 3 inches in diameter with a spiral groove beginning approximately one-fourth inch from the axis of rotation 18 and terminating approximately 1 ⅜ inches from the axis 18. With the pivotal axis 29 located approximately 1 ⅛ inches above the rotational axis 18, a manually operable control and indicator mechanism is provided that enables the knob 10 to be moved through sixteen complete 360° rotations for a total movement of the pointer 27 through an arc of approximately 60°. A scale 40 positioned on the surface 13 may be calibrated directly in terms of the rectilinear position of the spring seat 34.

Referring to FIG. 5, another embodiment of the manually operable control and indicator mechanism of the present invention is shown. In the embodiment of FIG. 5, the control knob 10, planar surface 11, and spiral groove 17, as well as the rotatable shaft 12 and rotational axis 18, are identical to the previously described embodiment. The indicator 50 includes a rectilinear slot 51 therein surrounding the shaft 12 and also includes an extension 53 having a scale 54 thereon. A follower 55 is formed integrally with the indicator while the indicator is restrained to rectilinear motion relative to the surface 13 by means of pins 56 and 57. An index 60 is mounted on the surface 13 adjacent the extension 53 to permit calibration of the scale 54. Rotation of the knob 10 imparts rectilinear motion to the indicator 50 through the expediency of the follower 55 engaging and following the spiral groove 17 and knob 10. The same advantages may be achieved by the embodiment of FIG. 5, although a greater degree of accuracy may be obtained with the previously described embodiment since the arcuate scale 40 of FIG. 1 may be expanded by simply increasing the length of the pointer 27, thereby permitting more accurate observation of the precise indicator position.

The knob 10 readily may be formed of any rigid material and cast or molded with the spiral groove therein; similarly, the indicator 20 may be readily be cast or molded to provide an extremely simple, rugged and inexpensive control and indicator mechanism.

I claim:

1. A manually operable control and indicator mechanism comprising: a wall having a stationary planar surface; a rotatable shaft extending through said wall; a knob secured to said shaft adjacent to said stationary planar surface for rotation with said shaft; said knob having a planar surface parallel to and opposing said stationary planar surface; means defining a spiral groove in the planar surface of said knob; an indicator movably mounted on said stationary planar surface and positioned between said stationary planar surface and the planar surface of said knob; said indicator extending from between said stationary planar surface and the planar surface of said knob to present visual indicator of the indicator's position; said indicator including a follower extending into and slidably engaging said spiral groove, whereby rotation of said knob imparts motion to said indicator through said groove and follower.

2. The combination set forth in claim 1, wherein said indicator is pivotally mounted on said stationary planar surface and includes an arcuate slot therein surrounding said rotational shaft to permit said indicator to pivot in accordance with the position of said follower.

3. The combination set forth in claim 1, wherein said indicator is slidably mounted on said stationary planar surface and wherein means secured to said stationary planar surface limit the motion of said indicator to only rectilinear motion.

* * * * *